(12) United States Patent
Harada

(10) Patent No.: US 9,400,625 B2
(45) Date of Patent: Jul. 26, 2016

(54) PRINTING APPARATUS, WEB SERVER, PRINTING SYSTEM, AND COMPUTER READABLE RECORDING MEDIUM STORED WITH PROGRAM FOR WEB SERVER

(75) Inventor: Yoshiyuki Harada, Saitama (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 123 days.

(21) Appl. No.: 13/484,324

(22) Filed: May 31, 2012

(65) Prior Publication Data

US 2012/0307303 A1    Dec. 6, 2012

(30) Foreign Application Priority Data

Jun. 1, 2011    (JP) ................................. 2011-123790

(51) Int. Cl.
*G06F 3/12*    (2006.01)
*G06K 15/00*    (2006.01)
*G06K 15/02*    (2006.01)

(52) U.S. Cl.
CPC ............ *G06F 3/1258* (2013.01); *G06F 3/1204* (2013.01); *G06F 3/1287* (2013.01); *G06K 15/005* (2013.01); *G06K 15/1806* (2013.01); *G06K 15/405* (2013.01)

(58) Field of Classification Search
USPC .................. 358/453, 448, 1.15, 1.18; 719/321
See application file for complete search history.

(56) References Cited

U.S. PATENT DOCUMENTS

| 2002/0004802 | A1 | 1/2002 | Shima | |
| 2009/0089811 | A1* | 4/2009 | Ferlitsch | G06F 3/1205 719/321 |
| 2010/0259783 | A1* | 10/2010 | Matsuzawa | H04N 1/00244 358/1.15 |
| 2011/0194145 | A1* | 8/2011 | Fukada | G06F 3/1206 358/1.15 |

FOREIGN PATENT DOCUMENTS

| JP | H10-326288 A | 12/1998 |
| JP | 2003-330653 A | 11/2003 |
| JP | 2004-046508 | 2/2004 |
| JP | 2005-115559 A | 4/2005 |
| JP | 2006-163984 A | 6/2006 |
| JP | 2007328639 A | 12/2007 |
| JP | 2008-152545 A | 7/2008 |
| JP | 2010-251972 A | 11/2010 |

OTHER PUBLICATIONS

Office Action (Notification of Reasons for Refusal) issued by the Japanese Patent Office on Sep. 17, 2013 in corresponding Japanese Patent Application No. 2011-123790 and an English translation of the Official Action. (6 pages).

(Continued)

*Primary Examiner* — Tammy Pham
*Assistant Examiner* — Bharatkumar Shah
(74) *Attorney, Agent, or Firm* — Buchanan Ingersoll & Rooney PC

(57) ABSTRACT

A printing apparatus for conducting direct printing from a client computer via a web browser, having a storage unit 13 and 16 stores print setting information and a URL associated with the print setting information, and a job control unit 12 reads from the storage unit the print setting information associated with the URL entered by a user into the web browser, in order to reflect the print setting information as print setting of print data.

21 Claims, 19 Drawing Sheets

(56) References Cited

OTHER PUBLICATIONS

Office Action (Notification of Reasons for Refusal) issued on Dec. 24, 2013, by the Japanese Patent Office in corresponding Japanese Patent Application No. 2011-123790, and an English Translation of the Office Action (8 pages).

Office Action (Notification of Reasons for Refusal) issued on Aug. 5, 2014, by the Japanese Patent Office in corresponding Japanese Patent Application No. 2011-123790 and an English translation of the Office Action. (4 pages).

Decision of Rejection issued in corresponding Japanese Patent Application No. 2011-123790, mailed Feb. 3, 2015 and English translation.

Decision for Dismissal of an Amendment issued in corresponding Japanese Patent Application No. 2011-123790, mailed Feb. 3, 2015 and English translation.

Shinji Shioda "Technology Supporting the Real-Time Web Age, the Comment Knowledge Which I Cannot Ask Now", Monthly Magazine ASCII Technologies, vol. 15, No. 11 ASCII Technologies, Japan, ASCII Media Works vol. 15, pp. 2-5.

* cited by examiner

FIG.6

| Item name | | Setting condition | Fixed |
|---|---|---|---|
| Name | | Weekly report | — |
| URL | | http://printXXX.xx/setting1234 | — |
| Print setting | N-up | 2up | No |
| | Duplex | On | No |
| | Color mode | Mono | Yes |
| | ... | ... | ... |
| Printing apparatus | | Departmental sharing MFP(10.12.xx.xx.) | Yes |

FIG.7

| Item name | Setting condition |
|---|---|
| Name | Departmental sharing MFP |
| Model name | KONICA MINOLTA Cxxx |
| Port | IP:10.12. xx. xx |
| Capability | |
| N-up | Off,2up,4up,6up,9up,16up |
| Duplex | Simplex,Duplex |
| Color mode | Color,Mono |
| Copies | 1~9999 |
| ... | ... |

PRINTING APPARATUS, WEB SERVER, PRINTING SYSTEM, AND COMPUTER READABLE RECORDING MEDIUM STORED WITH PROGRAM FOR WEB SERVER

CROSS-REFERENCE TO RELATED APPLICATION

This application is based on Japanese Patent Application No. 2011-123790 filed on Jun. 1, 2011, the contents of which are incorporated herein by reference.

BACKGROUND

1. Technical Field

The present invention relates to a web server, a printing apparatus, a printing system, and a computer readable recording medium stored with program for the web server, in particular, a web server, a printing apparatus, a printing system, and a computer readable recording medium stored with program for the web server intended for conducting direct printing via a web browser.

2. Description of Related Art

In recent years, printing apparatuses have come to have more sophisticated performance capabilities thanks to active development efforts so that users are now able to print out print data in various forms of printed materials by utilizing varieties of performance capabilities of the printing apparatuses.

As a prior art for reflecting a print setting for designating a certain function of a printing apparatus on print data, Unexamined Japanese Patent Publication No. 2005-115559 disclosed a method of storing in advance the print setting associated with an address of an e-mail and printing the print data attached to the e-mail based on the print setting associated with the address of the e-mail transmitted from a client terminal.

However, since such a prior art is to designate the print setting to the printing apparatus unilaterally by means of email, it is difficult to execute a flexible print setting such as designating the print setting by one user to another user or using the print setting with a partial modification.

SUMMARY

The present invention was made to solve the problems described above.

To achieve at least one of the abovementioned objects, a printing apparatus for conducting direct printing from a client computer via a web browser reflecting one aspect of the present invention comprises:

a storage unit that stores print setting information and a URL that associated with said print setting information; and a job control unit that reads from said storage unit said print setting information that associated with said URL entered by a user into said web browser, in order to reflect said print setting information as print setting of print data.

Moreover, to achieve at least one of the abovementioned objects, a non-transitory computer readable storage medium stored with a program to cause a web server to execute direct printing reflecting one aspect of the present invention, said program causing the web server to execute a process comprising:

a step (a) for storing print setting information and a URL that associated with said print setting information;

a step (b) for reading said print setting information that associated with said URL entered by the user into said web browser among said print setting information stored in said step (a), in order to reflect said printing setting information as print setting of print data.

Moreover, to achieve at least one of the abovementioned objects, a web server for conducting direct printing via a web browser reflecting one aspect of the present invention comprises:

a storage unit that stores print setting information and a URL that associated with said print setting information; and a job control unit that reads from said storage unit said print setting information that associated with said URL entered by a user into said web browser, in order to reflect said print setting information as print setting of print data.

Moreover, to achieve at least one of the abovementioned objects, a printing system for conducting direct printing via a web browser reflecting one aspect of the present invention comprises:

one of more client computers to which a user enters at said web browser a URL that associated with print setting of print data;

a storage unit that stores print setting information and a URL that associated with said print setting information;

a job control unit that reads from said storage unit said print setting information that associated with said URL entered by the user into said web browser at said client computer, in order to reflect said print setting information as print setting of print data.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 6 is a diagram showing the contents of print setting data.

FIG. 7 is a diagram showing the contents of printing apparatus data.

DETAILED DESCRIPTION

The printing apparatus, the web server, the printing system, and the computer readable recording medium stored with the program for the web server according to the embodiment of the present invention will be described in detail below with reference to the accompanying drawings.

Figure 1:
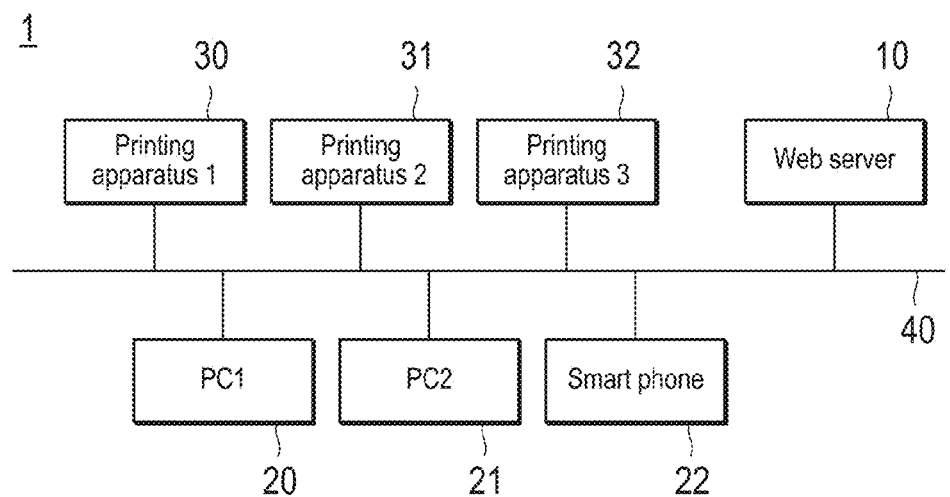
FIG. 1 is a block diagram of a printing system according to an embodiment of the present invention.

FIG. 1 is a block diagram showing a printing system according to an embodiment of the present invention.

As shown in FIG. 1, the printing system 1 comprises personal computers (client computers) 20 and 21, a smart phone (client computer) 22, a web server 10, and printing apparatuses 30, 31, and 32.

The personal computers 20 and 21, the web server 10, and the printing apparatuses 30-32 are communicably connected with each other via a network 40. The network 40 can consist of a LAN (Local Area Network) that connects computers and network equipment with each other based on standards such as Ethernet, TokenRing, and FDDI (Fiber Distributed Data Interface), etc., or a WAN (Wide Area Network) that connects LANs via dedicated lines, etc.

In this case, the personal computers 20 and 21 and the smart phone function as client terminals and the number of units is not limited to any particular number. The number of units of printing apparatuses 30-32 is also not limited to any particular number.

The web server 10 can be represented by a function that one of the printing apparatuses 30-32 has.

Figure 2:
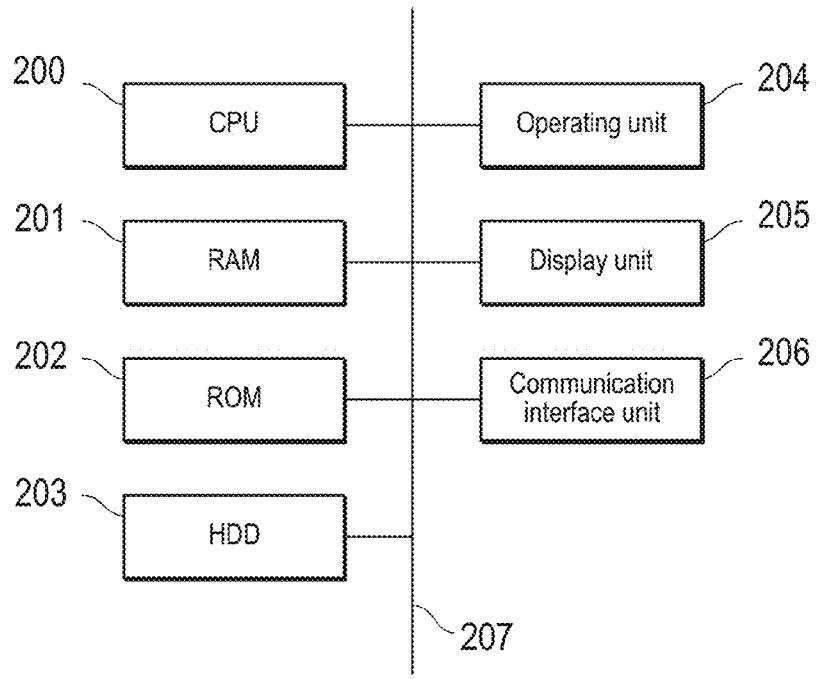
FIG. 2 is a block diagram showing the configuration of a personal computer.

FIG. 2 is a block diagram showing the configuration of the personal computer according to the present embodiment.

As shown in FIG. 2, the personal computers 20 and 21 are each equipped with a CPU (Central Processing Unit) 200, a RAM (Random Access Memory) 201, a ROM (Read Only Memory) 202, HDD (Hard Disk Drive) 203, an operating unit 204, a display unit 205, and a communication interface unit 206, which are connected via a bus 207 for exchanging signals. While the smart phone 22 has a voice communication function, its other functions are identical to those of the personal computers 20 and 21 that are described below, so that its description are omitted here to be sufficed by those of the personal computers 20 and 21.

The CPU 200 controls various units described above and executes various types of arithmetic operations in accordance with its program.

The RAM 201 temporarily stores programs and data as a work area.

The ROM 202 stores various programs and various kinds of data.

The HDD 203 stores various programs including the operating system and various types of data.

The operating unit 204 includes a pointing device such as a mouse or a keyboard, and it is used for various operations and for entering various input.

The display unit 205 is typically a liquid crystal display capable of displaying various types of information.

The communication interface unit 206 is an interface for communicating with external equipment, and is compatible with an network interface according to standards such as Ethernet, TokenRing, and FDDI, a serial interface such as USB and IEEE1394, a parallel interface such as SCSI (Small Computer System Interface) and IEEE1284, a wireless communication interface such as BlueTooth (registered trademark), IEEE802.11, HomeRF (Home Radio Frequency), and IrDA (Infrared Data Association), a telephone circuit interface for connecting with telephone circuits, etc.

The user can start up the web browser at either the personal computer 20 or 21, designate print data stored in the HDD 203 at the web browser, upload the print data to be printed to the web server 10, and print the print data at either for the printing apparatuses 30-32 using the direct printing function of the web server 10. The print data is the data of a document to be printed, and the print data includes various data such as image data, vector data (graphic data), and text data. For example, the print data can be PDF (Portable Document Format) data or TFF (Tagged Image File Format).

The user can designate one or more printing apparatuses 30-32 to be used for printing at the web browser, and also designate the print setting associated with a particular URL (Uniform Resource Locater) as a print setting for the particular print data by entering the URL at the web browser.

Figure 3:
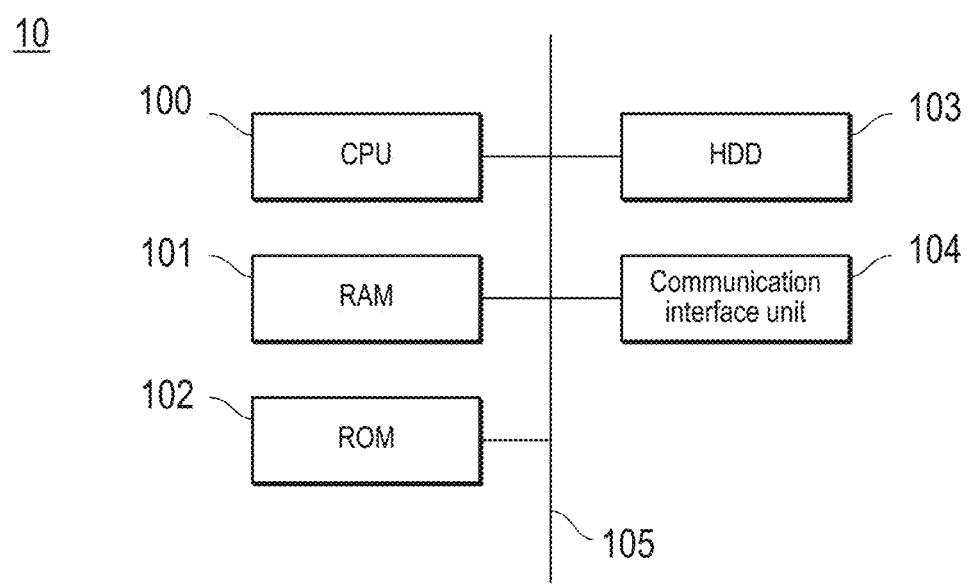
FIG. 3 is a block diagram showing the configuration of a web server according to an embodiment of the present invention.

FIG. 3 is a block diagram showing the configuration of a web server according to the present embodiment.

Each element that constitutes the web server 10 is essentially identical to those of the personal computers 20 and 21 and is equipped with a CPU 100, a RAM 101, a ROM 102, a HDD 103, and a communication interface unit 104, which are communicated with each other via a bus 105 for exchanging signals. The descriptions of the functions of these elements that constitute the web server 10 are omitted here in order to avoid duplications as they are identical to those of the personal computers 20 and 21.

Generally, the web server 10 is required to have a high data processing capability and a high reliability. Therefore, the CPU 31 that constitutes the web server 10, for example, can have an expanded arithmetic parallel processing capability by having it constituted with a multi-core processor CPU. It is also possible to increase the capacity of the cache memory of the CPU 31 by using a cache DRAM in order to improve the application performance. The HDD 34 can be constituted of RAID (Redundant Arrays of Inexpensive Disks) to expand the data storage area in order to improve its redundancy.

The web server 10 receives the print data that the user intends to print and the URL as designation of the print setting from either of the personal computers 20 and 21 via the web browser, identifies the print setting designated in accordance with correspondence between the URL and the print setting which are stored in the HDD in advance, and generates print job on which the print setting which is identified is reflected as the print setting of the print data. The print job contains the print data to be printed and a job ticket containing the data for the print setting (hereinafter referred to as "print setting data"). The print job is transmitted by the web server 10 to the printing apparatuses 30-32 specified in the print setting data and the printed document is outputted from the printed apparatuses 30-32 based on the print job.

Figure 4:
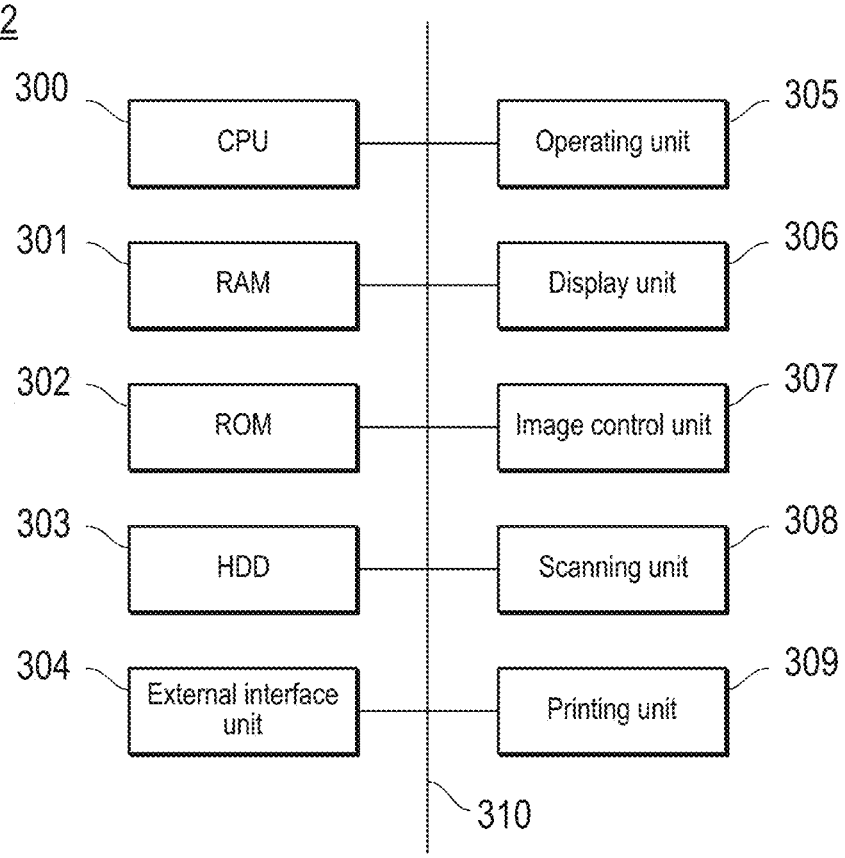
FIG. 4 is a block diagram showing the configuration of a printing apparatus according to an embodiment of the present invention.

FIG. 4 is a block diagram showing the configuration of a printing apparatus according to the present embodiment.

As shown in FIG. 4, each of the printing apparatuses 30, 31, 32 is equipped with a CPU 300, a RAM 301, a ROM 302, a HDD 303, an external interface unit 304, an operating unit 305, a display unit 306, an image control unit 307, a scanning unit 308, and a printing unit 309, all of those constituents being connected with each other to exchange signals via a bus 310. The printing apparatus can consist of an MFP (Multifunction Peripheral).

The CPU 300 controls various constituents described above and executes various kinds of arithmetic operations in accordance with program. In other words, the CPU 300 is in charge of controls generally concerning various processes, printing, and storage in coordination with various constituents that constitute the printing apparatus 30.

The RAM 301 temporarily stores various kinds of data received via the scanning unit 308 or the network 40. The print data stored in the RAM 301 is processed by the CPU 300 and transmitted to the HDD 303 and the image control unit 307 as needed.

The HDD 303 is a device used to store various programs including programs to control various constituents of the printing apparatuses 30-32 by the CPU 300, and various kinds of data such as information for its own processing function and print data applied with the image processing. The program and data stored in the HDD 303 are retrieved as necessary by the CPU 300 and is executed or processed on the RAM 301.

The external interface unit 304 is an interface for communicating between the printing apparatuses 30-32 and external equipment and can be constituted of a network interface based on standards such as Ethernet, TokenRing, FDDI, etc., a serial interface such as USB, IEEE 1394, etc., a parallel interface such as SCSI, IEEE 1284, etc., various kinds of local connection interfaces such as a wireless communication interface such as Bluetooth (registered trademark) IEEE 802.11, HomeRF, IrDA, etc., a telephone circuit interface for connecting with a telephone circuit, and the like.

The operating unit 305 consists of a touch screen for entering various kinds of settings, and various fixed keys such as a ten-key for setting the number of copies to make, etc., a start key for commanding the start of operation, a stop key for commanding the stop of operation, and a reset key for initialized various setup conditions, etc.

The display unit 306 consists of a touch screen for displaying various kinds of information and for entering various kinds of settings, various fixed keys such as a ten-key for setting the number of copies to make, etc., a start key for commanding the start of operation, a stop key for commanding the stop of operation, and a reset key for initialized various setup conditions, and display lamps, etc. The overlapping functions of the operating unit 305 and the display unit 306 can be arrange to exist only on one of the operating unit 305 and the display unit 306.

The image control unit 307 executes the rasterizing process and the layout process of the print data contained in the print job.

The scanning unit 308 irradiates the document which is manually set at the designated scanning position of the document table with a light source such as a fluorescent lamp, and converts the light reflected from the document to electrical signal by an imaging apparatus such as a CCD (Charge Coupled Device) image sensor in order to generate image data (bitmap data) from the electrical signal.

The printing unit 309 prints on a sheet of paper an image based on print data contained in the print job by means of the electronic photographing method comprising the charging, exposing, developing, transferring, and fixing processes, and discharges the printed sheet. In other words, the printing unit 309 prints the image data based on the print data contained in the print job received from the external interface unit 304, or the image data acquired by the scanning unit 308 using development material on a sheet of paper, which is then outputted.

Therefore, each of the printing apparatuses 30-32 receives the print job containing the print data and the job ticket from the web server 10, and outputs the printed material based on the print data according to the print setting contained in the job ticket.

Figure 5:
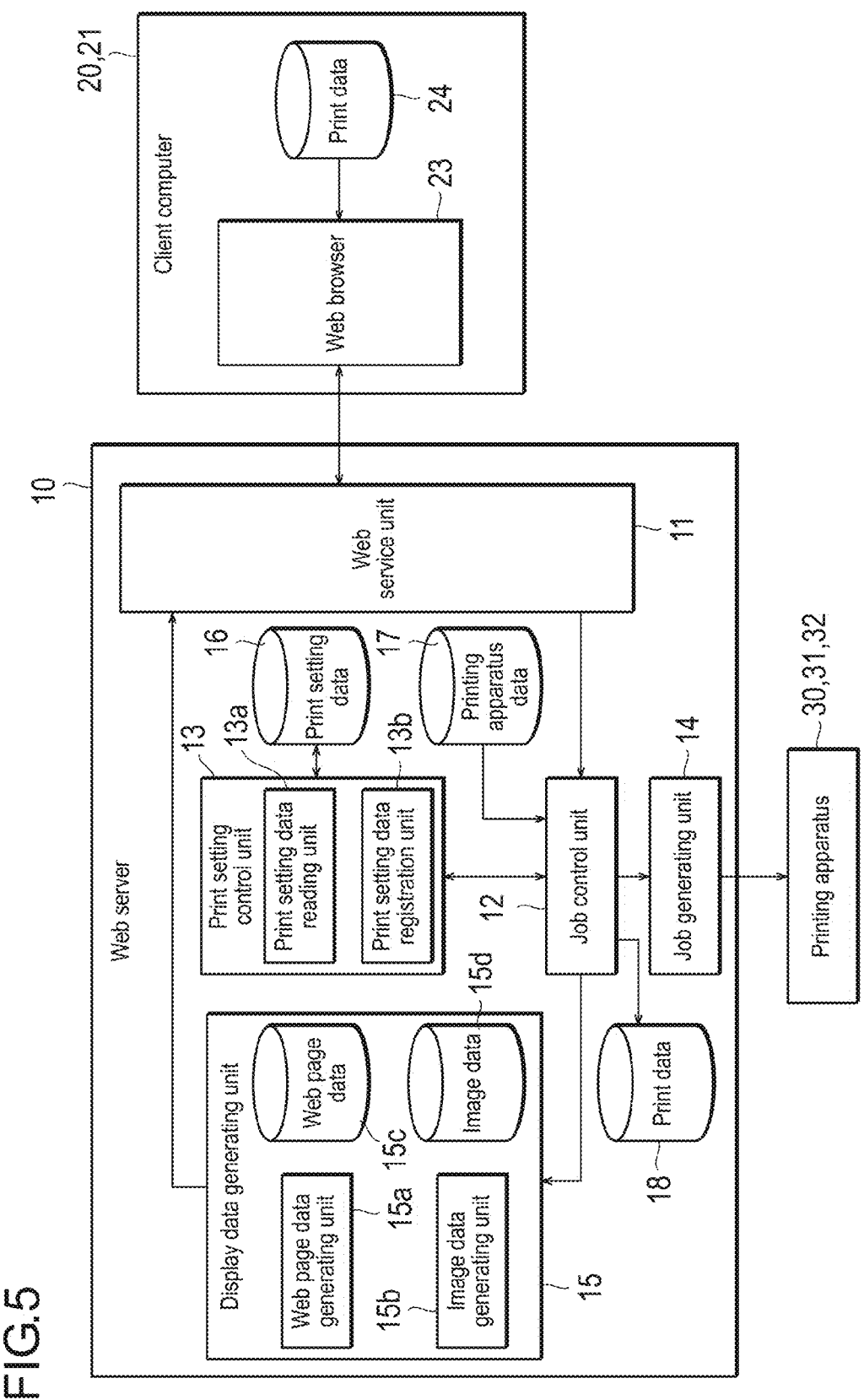
FIG. 5 is a functional block diagram of a printing system according to an embodiment of the present invention.

FIG. 5 is a functional block diagram of a printing system according to the present embodiment. Although FIG. 5 shows for the sake of simplicity one each only of the client computers 20 and 21, web server 10, and printing apparatuses 30-32, the number of these items are not limited to any specific quantity.

The client computers 20 and 21 have a web browser 23 and a print data storage unit 24.

The web browser 23 functions as the user interface for exchanging various kinds of data with the web server 10.

The print data storage unit 24 stored print data.

The user can upload the particular print data that the user intends to print among the print data stored in the print data storage unit 24 to the web server 10 via the web browser 23. The user can also execute the print setting of the print data that the user intends to print by entering the URL via the browser 23, and modify the contents of the previous print setting displayed on the web browser 23 in order to update the print setting data and use the print setting updated.

The web server 10 comprises a web service unit 11, a job control unit 12, a print setting control unit 13, a job generating unit 14, a display data generating unit 15, a print setting data storage unit 16, a printing apparatus data storage unit 17, and a print data storage unit 18.

The web service unit 11 functions as the user interface for exchanging various kinds of data with the client computers 20 and 21.

The job control unit 12 generally manages various kinds of information for each session from the client computers 20 and 21 and controls various functional units that constitute the web server 10.

The print setting control unit 13 comprises a print setting data reading unit 13a and a print setting data registration unit 13b. The print setting data reading unit 13a reads from the print setting data storage unit 16 the print setting data that associated with the URL received from the client computer 20. The print setting data registration unit 13b stores each of the print setting data into the print setting data storage unit 16 in association with each URL in order to register both the print setting data and the URLs.

The display data generating unit 15 comprises a web page data generating unit 15a, an image data generating unit 15b, a web page data storage unit 15c, and an image data storage unit 15d.

The web page data preparation unit 15a generates the web page data for displaying information on the web browser 23 of the client computer 20. The web page data can be generated by the HTML (HyperText Markup Language) or CSS (Cascading Style Sheets) format for example.

The image data generating unit 15b generates the image data for displaying images on the web browser of the client computer 20. The image data generating unit 15*b* can generate image data based on the print data. The image data can be generated by the JPEG (Joint Photographic Experts Group or BMP (BitMap Image) format for example.

The web page data storage unit 15*c* stores the web page data generated by the web page data generating unit 15*a*.

The image data storage unit 15*d* stores the image data generated by the image data generating unit 15*b*.

The display data comprises the web page data and the image data.

The printing apparatus data storage unit 17 stores the data that specifies each of the printing apparatuses 30-32 and the data that specifies the functions of each of the printing apparatuses 30-32. The data that specifies each of the printing apparatuses 30-32 can be, for example, an IP (Internet Protocol) address or a MAC (Media Access Control) address. The data that specifies the functions of each of the printing apparatuses 30-32 can be the data that shows the applicability of stapling, punching, duplex printing, or color printing.

The printing data storage unit 18 stores the print data the web server 10 received from the client computer 20 or 21.

The job generating unit 14 generates the print job to be transmitted to the printing apparatuses 30-32 to be printed.

FIG. 6 is a diagram showing the contents of print setting data.

As shown in FIG. 6, the print setting data comprises members such as "name of the print setting," "URL that associates with the present print setting data," "print setting" and "printing apparatus to which the present print setting data is applied." For example, the name of the print setting can be set up "Weekly report," while the print setting can be set up in such a manner as "2up" for the N-up printing setting, "On" for duplex printing setting, and "Mono" for color or monochromatic selection setting. Moreover, a select of whether or not the setting can be locked can be added in case of the "print setting" and "printing apparatus to which the present print setting data is applied." By selecting "Yes" for the select of whether or not the setting can be locked, no modification by the user can be made possible.

It can also be configured in such a way that only the administrator can modify the print setting for specific items by selecting "Yes" for the select of whether or not the setting can be locked. For example, cost reduction can be achieved by locking the color vs. monochromatic select to monochromatic only. If "No" is selected in the select of whether or not the setting can be locked, the user can modify the print setting anyway the user desires.

The print setting data can include setting for stapling and punching.

FIG. 7 is a diagram showing the contents of printing apparatus data.

As shown in FIG. 7, the printing apparatus data can include members such as "name of the printing apparatus," "model name of the printing apparatus," "port of the printing apparatus," and "capabilities of the printing apparatus." "Name of the printing apparatus" can be determined by the user as desired. "Port of the printing apparatus" can be the IP address of the printing apparatus. "Capabilities of the printing apparatus" can include the select of on/off and type of N-up printing (N-up), duplex printing select (Duplex), color/monochromatic printing select (Color Mode), and the number of copies (Copies).

Figure 8:
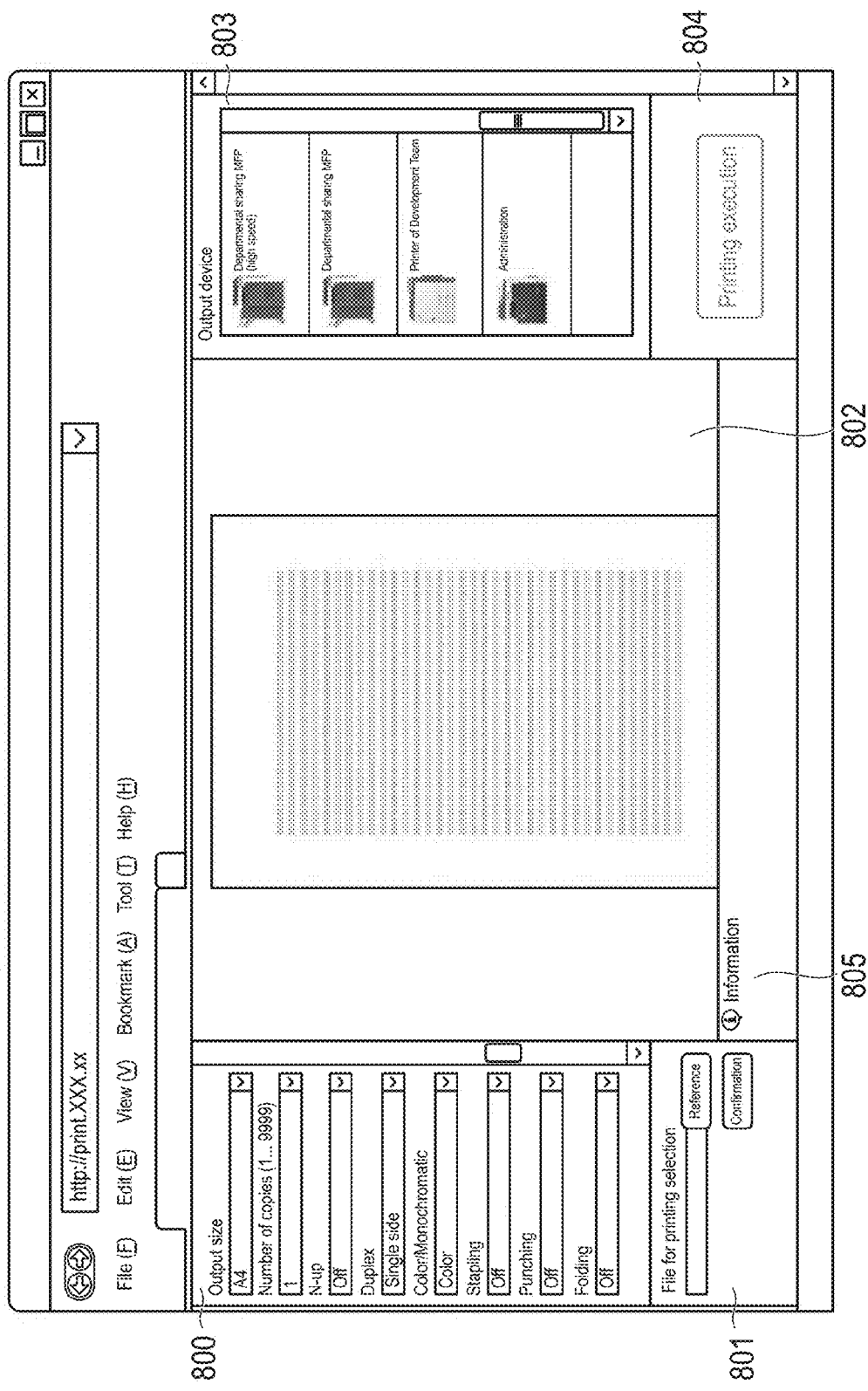
FIG. 8 is a diagram showing a print setting information setup screen to be displayed on the web browser of the client computer.

FIG. 8 is a diagram showing a print setting information setup screen displayed on the web browser of the client computer.

As shown in FIG. 8, the print setting information setup screen comprises a print setting input part 800, a file for printing selection part 801, a print preview part 802, an output device selection part 803, a print executing instruction part 804, and an information part 805.

The print setting input part 800 displays the print setting data that associates with the URL entered to the web browser 23. The user can enter or modify the print setting at the print setting input part 800. The user can select the print data (file) to be printed at the file for printing selection part 801. At that time, the user can make reference to the print data stored in the print data storage unit 24 of the client computers 20 and 21 by using the reference button and select the file to be printed from the print data. The print preview part 802 displays dynamically the preview screen which is the image of the printed material according to the present print setting. The output device selection part 803 displays the printing apparatus stored as data in the printing apparatuses data storage unit 17 of the web server 10 and the user can select the printing apparatus to be used for printing. The user can instruct the execution of printing from the print executing instruction part 804, and obtain various kinds of information from the information part 805.

The print setting information setup screen shown in FIG. 8 is an initial screen and the print setting and the preview screen displayed there are those of the initial setup. The user can establish the session (communication) cooperatively between the client computers 20, 21 and the web server 10 by displaying this initial screen on the web browser 23.

Figure 9:
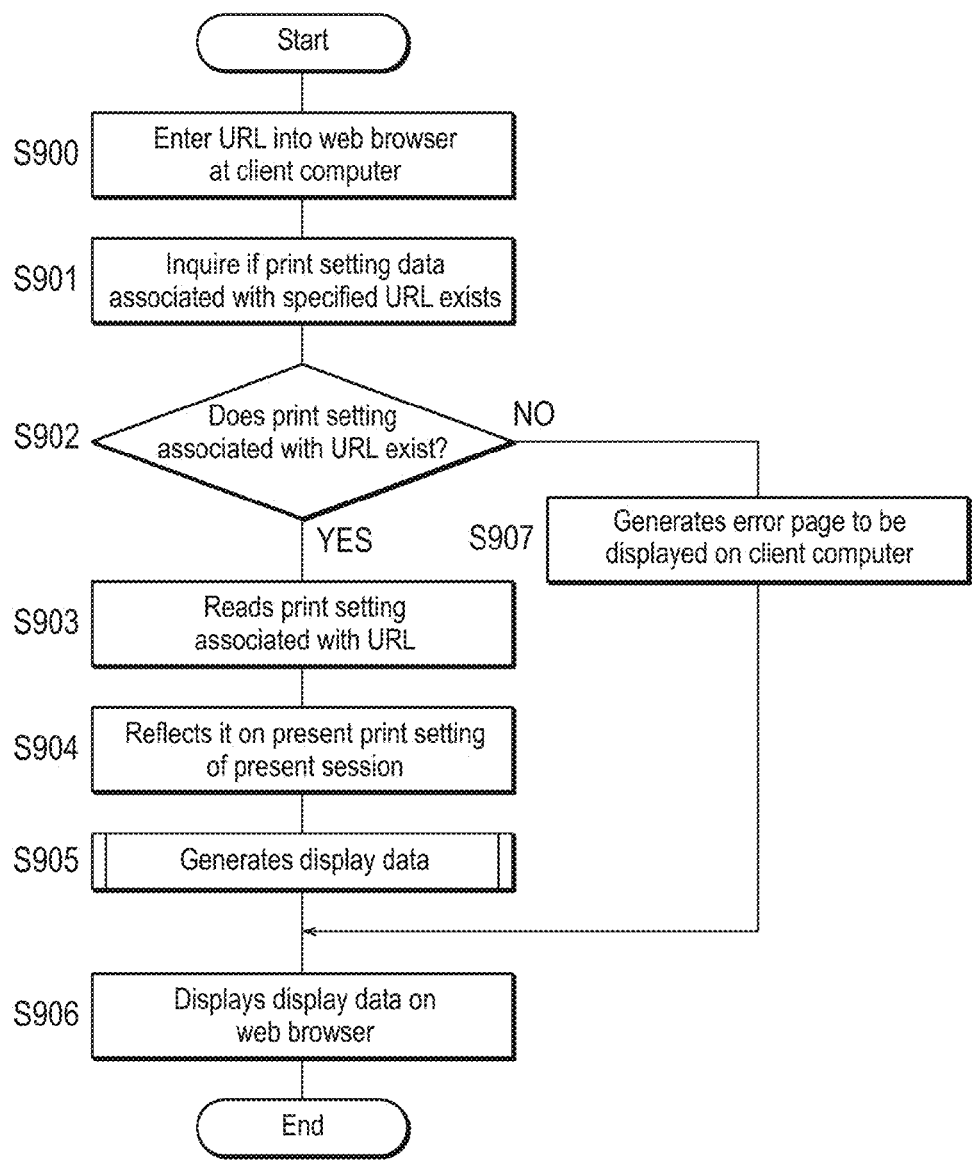
FIG. 9 is a diagram showing a flow chart when the URL for the print setting is entered into the web browser and the preview screen is displayed for a printed material for which the print setting is made.

FIG. 9 is a diagram showing a flow chart when the URL for the print setting is entered into the web browser and the preview screen is displayed on the web browser for the printed material for which the print setting is made. In each flowchart to be described sequentially below, the steps the web server 10 executes can be executed by the web server 10 and a program for web server related to the present embodiment installed on the web server 10.

The URL for the print setting is entered by the user from the client computer 20 or 21 (S900).

The URL that is entered into the web browser 23 in step S900 is transmitted to the web server 10 from the client computer 20 or 21, and the job control unit 12 issues a query for the print setting control unit 13 whether there is any print setting data associated with the specified URL (S901). If the print setting data associated with the specified URL is exist in the print setting data storage unit 16 (S902: Yes), the print setting control unit 13 reads the print setting data associated with the particular URL (S903). The job control unit 12 causes the print setting data read by the print setting control unit 13 to be reflected on the present print setting of the present session (S904), and causes the display data generating unit 15 to generate the display data for displaying on the web browser 23 of the client computers 20 and 21 the present print setting and the preview screen of the printed material on which the present print setting is applied (S905).

Figure 10:
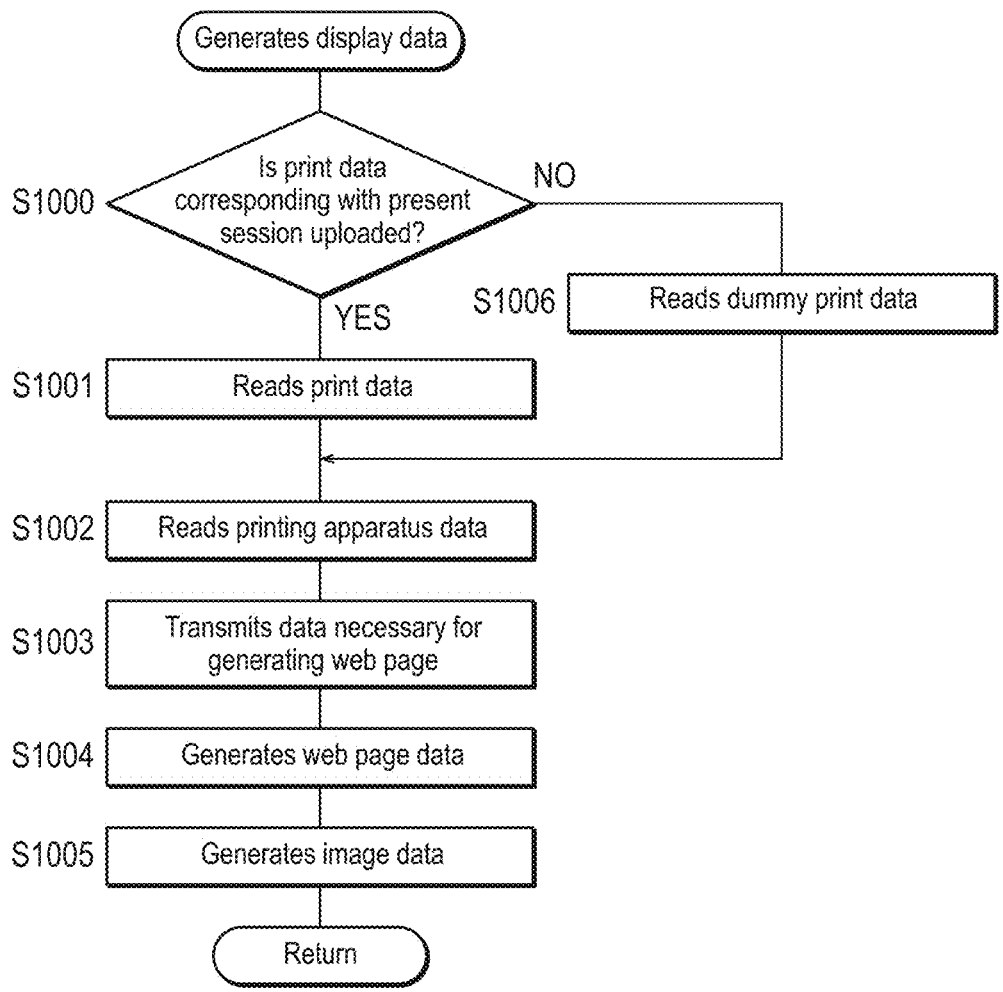
FIG. 10 is a diagram showing a subroutine flowchart for the display data generating unit to generate display data.

FIG. 10 is a diagram showing the subroutine flowchart for the display data generating unit to generate the display data.

The job control unit 12 of the web server 10 confirms at the print data storage unit 18 whether or not the print data that corresponds to the present session is uploaded from the client computer 20 or 21 to the web server 10 (S1000). If the print data is uploaded (S1000: Yes), the job control unit 12 reads the print data from the print data storage unit 18 (S1002). If the print data is not uploaded (S1000: No), the job control unit 12 reads dummy print data from the print data storage unit 18 (S1006).

The job control unit 12 reads from the printing apparatus data storage unit 17 the printing apparatus information of the printing apparatus specified by the print setting data (S1002).

The job control unit 12 transmits the data necessary for the generation of the display data to the display data generating unit 15 (S1003). The display data generating unit 15 generates the web page data and the image data constitute the display data based on the data necessary for the generation of the display data received from the job control unit 12 (S1004, S1005). The data necessary for the generation of the display data contains the print data and the print setting data.

The client computers 20 and 21 display on the web browser 23 the display data received from the web server 10 (S906).

Figure 11:
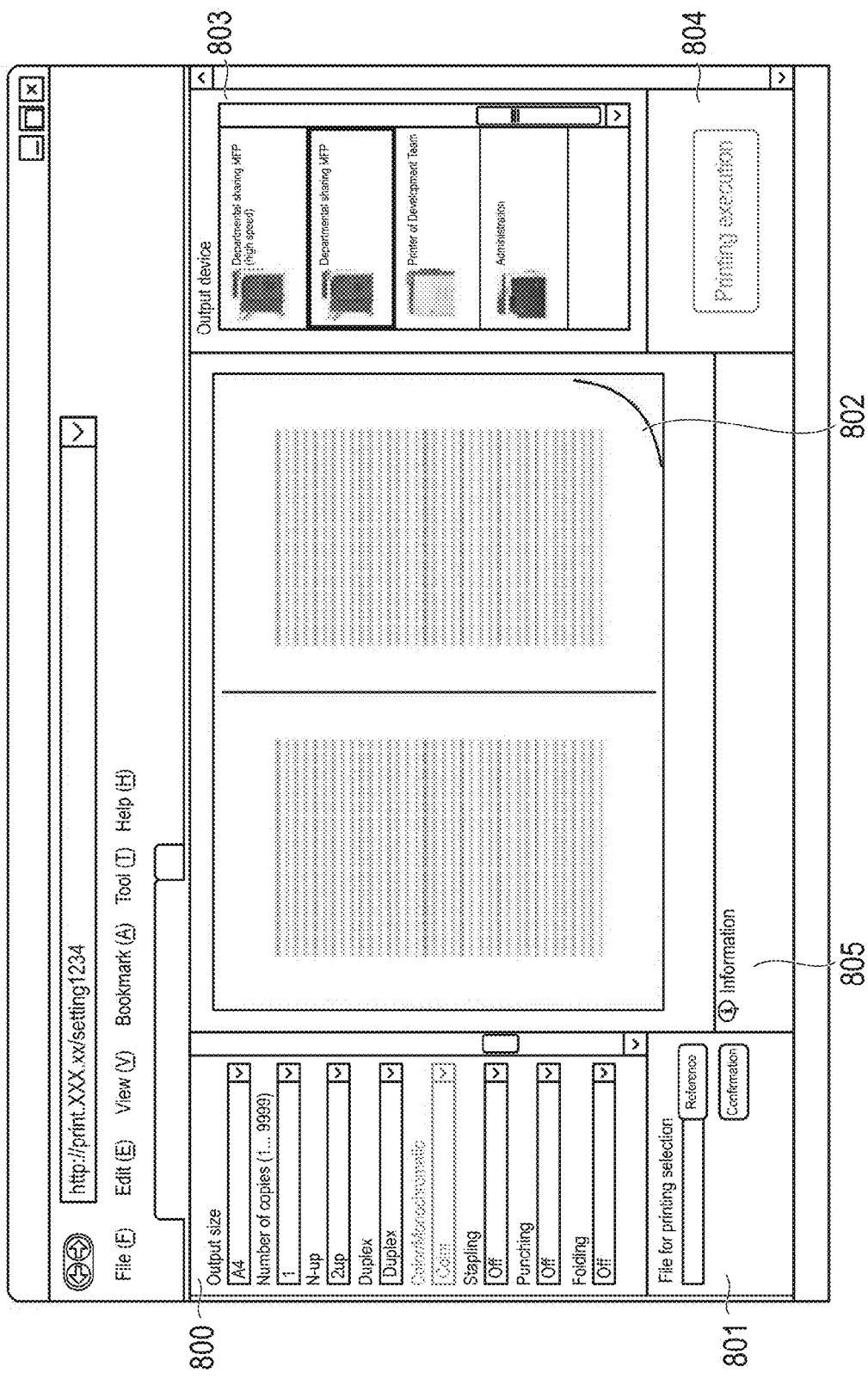
FIG. 11 is a diagram showing a print setting information screen to be displayed on the web browser if the print data of a print object is not selected.

FIG. 11 is a diagram showing a print setting information screen to be displayed on the web browser if the URL is entered and the print data of a print object is not selected.

As shown in FIG. 11, the registered URL is entered in the web browser, and the print setting associated with the URL is displayed on the print setting input part 800.

However, since the print data is not selected at the file for printing selection part 801 of the web browser 23, the image data of the dummy print data is displayed reflecting the present print setting data on the preview unit 802. Such dummy print data is displayed on the web browser 23, for example, in case the print data corresponding to the present session is not uploaded on the web server 10.

Incidentally, an "departmental sharing MFP" is selected by the output device selection part 803 as the printing apparatus to be used for printing.

Figure 12:
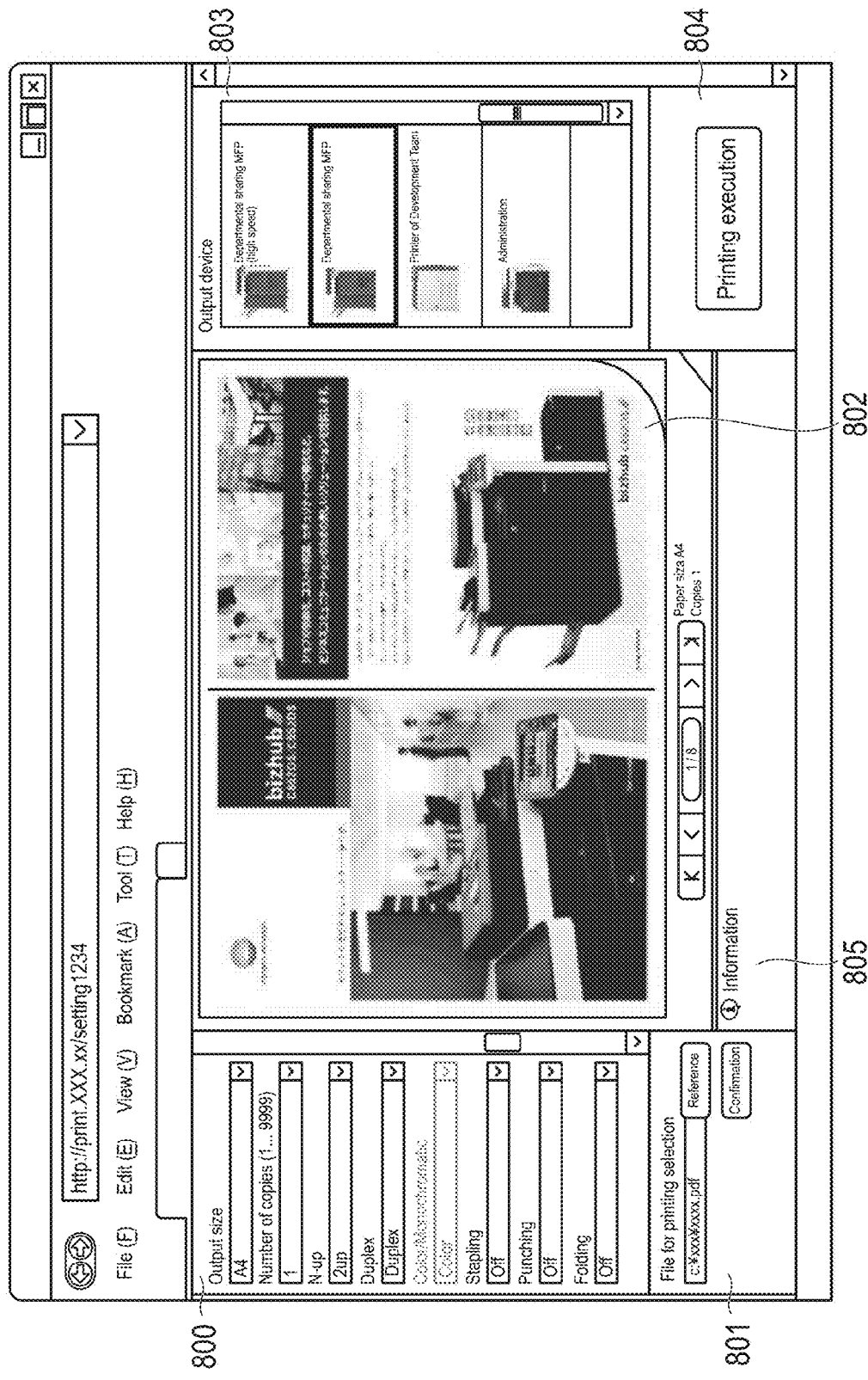
FIG. 12 is a diagram showing a print setting information screen to be displayed on the web browser when the print data intended to print is selected.

FIG. 12 is a diagram showing a print setting information screen to be displayed on the web browser if the print data of a print object is selected.

As shown in FIG. 12, if the print data is selected at the file for printing selection part 801 of the web browser 23, the selected print data is uploaded to the web server 10 in order to generate the image data based on the print data, so that the image data of the selected print data is displayed on the preview part 802 with the present print setting reflected on it.

As such, according to the web server 10 of the present embodiment, the appearance of the printed material based on the print setting associated with the particular URL can be easily grasped by simply entering the URL to the web browser by the user. Moreover, the appearance of the printed material based on the print setting associated with the entered URL can be quickly grasped concerning the print data to be printed by designating the print data at the web browser.

Figure 13:
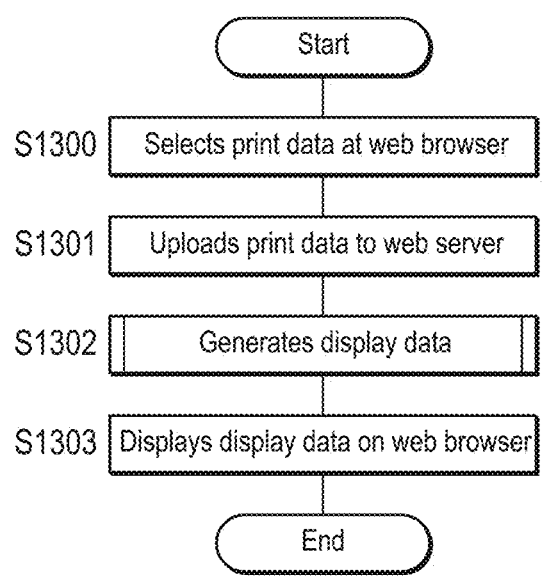
FIG. 13 is a diagram showing a flowchart to be displayed when the print data is to be uploaded from the client computer to the web server.

FIG. 13 is a diagram showing a flowchart to be displayed if the print data is to be uploaded from the client computer to the web server.

When the user selects the print data at the web browser 23 of the client computer 20 or 21 (S1300), the client computer 20 or 21 uploads the selected print data to the web server 10 (S1301).

The web server 10 generates the display data based on the print data uploaded by the display data generating unit 15 (S1302).

The client computers 20 and 21 receive the display data from the web server 10, and display the display data on the web browser 23 (S1303).

Figure 14:
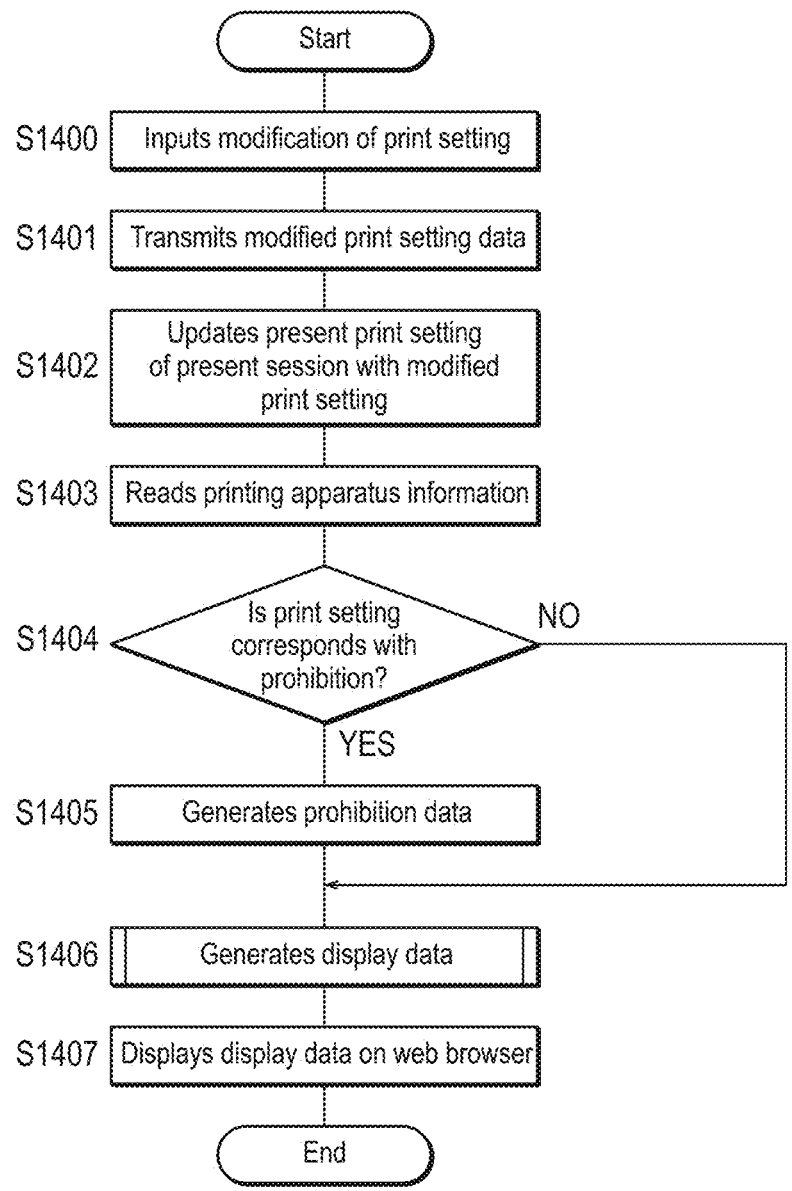
FIG. 14 is a diagram showing a flowchart when the print setting is to be modified on the web browser of the client computer.

FIG. 14 is a diagram showing a flowchart when the print setting is to be modified on the web browser of the client computer.

When the user modifies the print setting at the web browser 23 of the client computer 20 or 21 (S1400), the modified print setting data is transmitted to the web server 10 (S1401).

When the modified print setting data is transmitted to the web server 10 in Step S1401, the present print setting is updated by the modified print setting data at the job control unit 12, and the updated print setting is stored in the print setting data storage unit 16 (S1402).

The job control unit 12 reads from the printing apparatus data storage unit 17 the printing apparatus data of the printing apparatus specified by the updated print setting data (S1403).

If the print setting according to the updated print setting data corresponds to a case of prohibition concerning the apparatus data read in the step S1403 (S1404: Yes), the job control unit 12 generates prohibition data (S1405). A "case of prohibition" here means a case when the print setting is setup for a function that is not supported by the printing apparatus, etc. For example, it is a case where the duplex printing is specified in the print setting although the printing apparatus is not supporting the duplex printing. The prohibition data means the data that contains prohibition contents.

The display data generating unit 15 generates the print setting based on the print data by reflecting the modified print setting data (S1406). If the prohibition data is generated in the step S1405, the display data based on the prohibition data is generated.

The generated display data is transmitted to the client computers 20 and 21, and displayed on the web browser 23 of the client computers 20 and 21 (S1407).

Thus, according to the web server 10 according to the present embodiment, it is possible to display the print setting associated with the URL by entering the URL into the web browser in order to update the print setting on the web browser, so that the print setting with a partial modification can be easily made.

Figure 15:
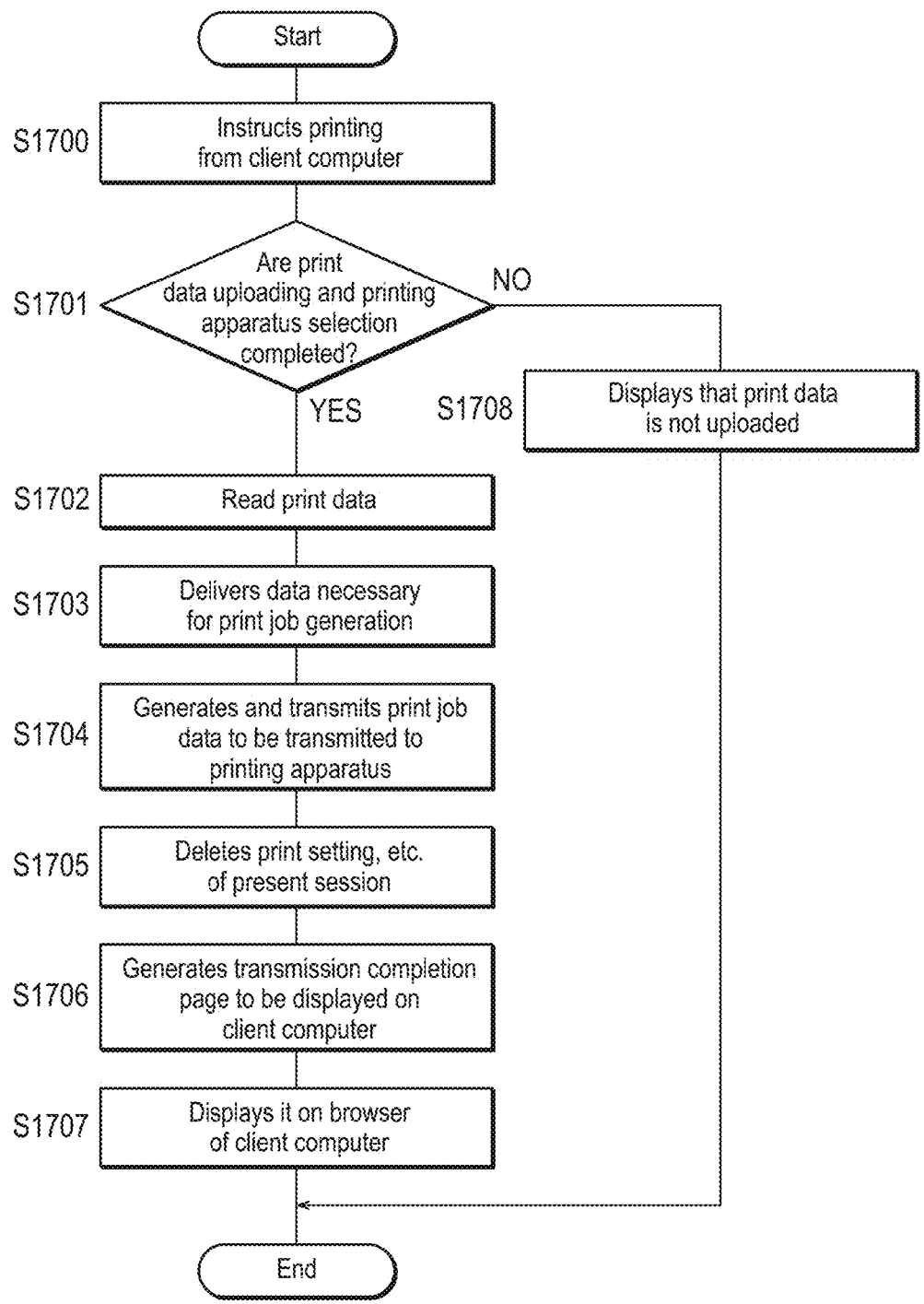
FIG. 15 is a diagram of showing a flowchart when direct printing is to be executed via the web browser.

FIG. 15 is a diagram of showing a flowchart when direct printing is to be executed via the web browser.

When the printing instruction of the user is received from the client computer 20 or 21 (S1700), the web server 10 makes a judgment as to whether or not the uploading of the print data to the web server 10 and the selection of the printing apparatus to be used for outputting the printed material are completed (S1701).

If the uploading of the print data to the web server 10 and the selection of the printing apparatus to be used for outputting the printed material are not completed (S1701: No), the web server 10 transmits a message that the uploading of the print data or the selection of the printing apparatus is not completed to the client computers 20 and 21, and the client computers 20 and 21 display the message received (S1708).

If the uploading of the print data to the web server 10 and the selection of the printing apparatuses 30-32 to be used for outputting the printed material are completed (S1701: Yes), the web server 10 reads the print data from the print data storage unit 18 at the job control unit 12 (S1702).

The job control unit 12 transmits the data necessary for the generation of the print data to the job generating unit 14. The data necessary for the generation of the print job contains the print data and the print setting data.

The job generating unit 14 generates the print job data based on the data necessary for generation of the print job received from the job control unit 12, and transmits it to the printing apparatuses 30-32 (S1704).

The job control unit 12 deletes the print data and the print setting data read for the present session (S1705), and causes the display data generating unit to generate the display data for displaying a message that the transmission to the printing apparatuses 30-32 is completed at the web browser 23 of the client computers 20 and 21 (S1706).

The display data generated by the display data generating unit 15 is transmitted to the client computers 20 and 21, and displayed on the web browser 23 of the client computers 20 and 21 (S1707).

Figure 16:
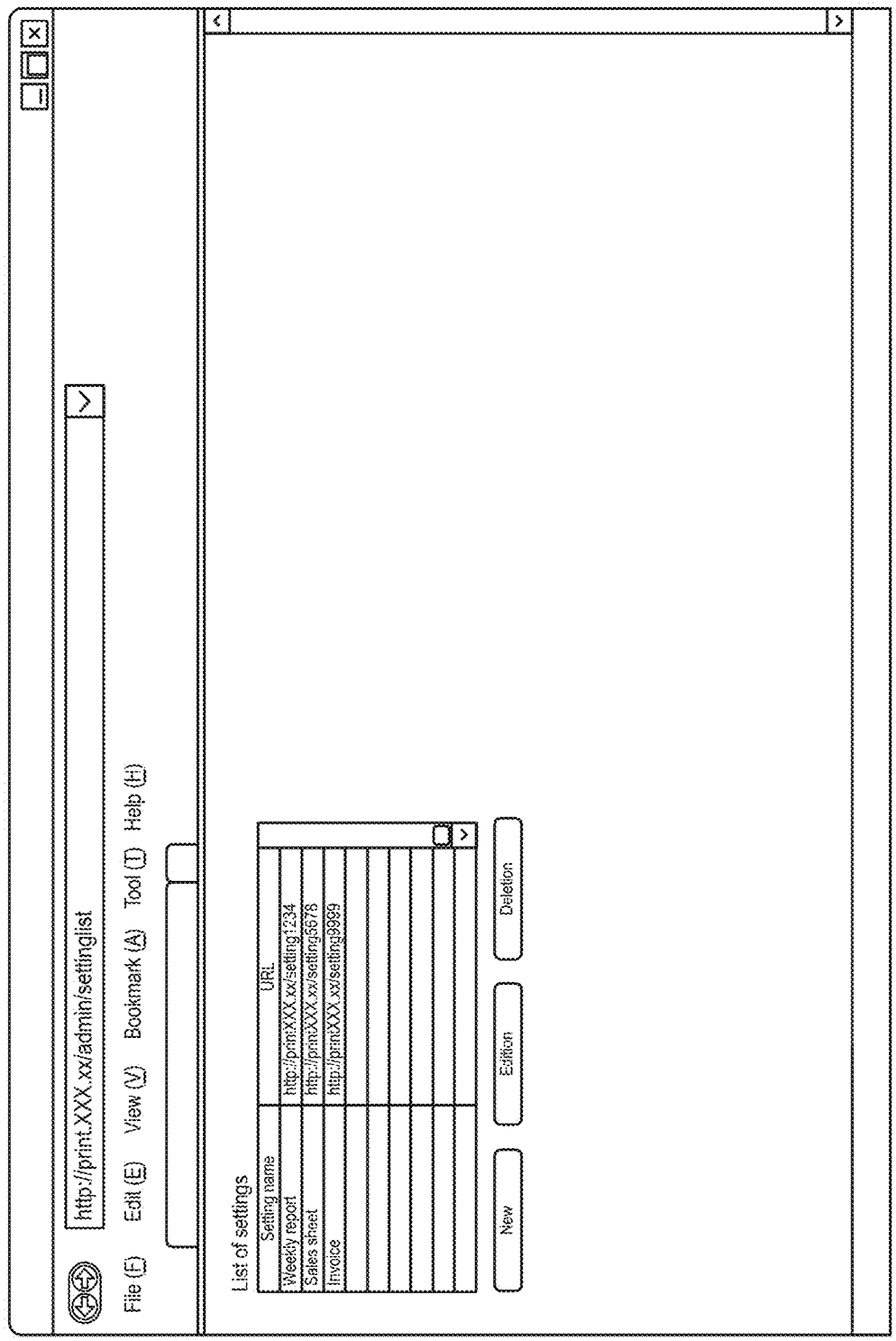
FIG. 16 is a diagram showing a list display screen of print setting data to be referenced in newly registering, editing and deleting of the print setting.

FIG. 16 is a diagram showing a list display screen of print setting data to be referenced in newly registering, editing and deleting of the print setting.

As shown in FIG. 16, the list display screen of the print setting data displays the names of the print setting of the print setting data and the URL associated with the print setting data registered in the print setting control unit 13 of the web server 10. Also displayed there are selection buttons for the user to select either new registration, edition or deletion of the print setting.

The user can cause the web browser 23 of the client computer 20 or 21 to display the list display screen of the print setting data, select the name of the print setting to be edited, and edit the print setting selected by pressing the "Edit" selection button.

Figure 17:
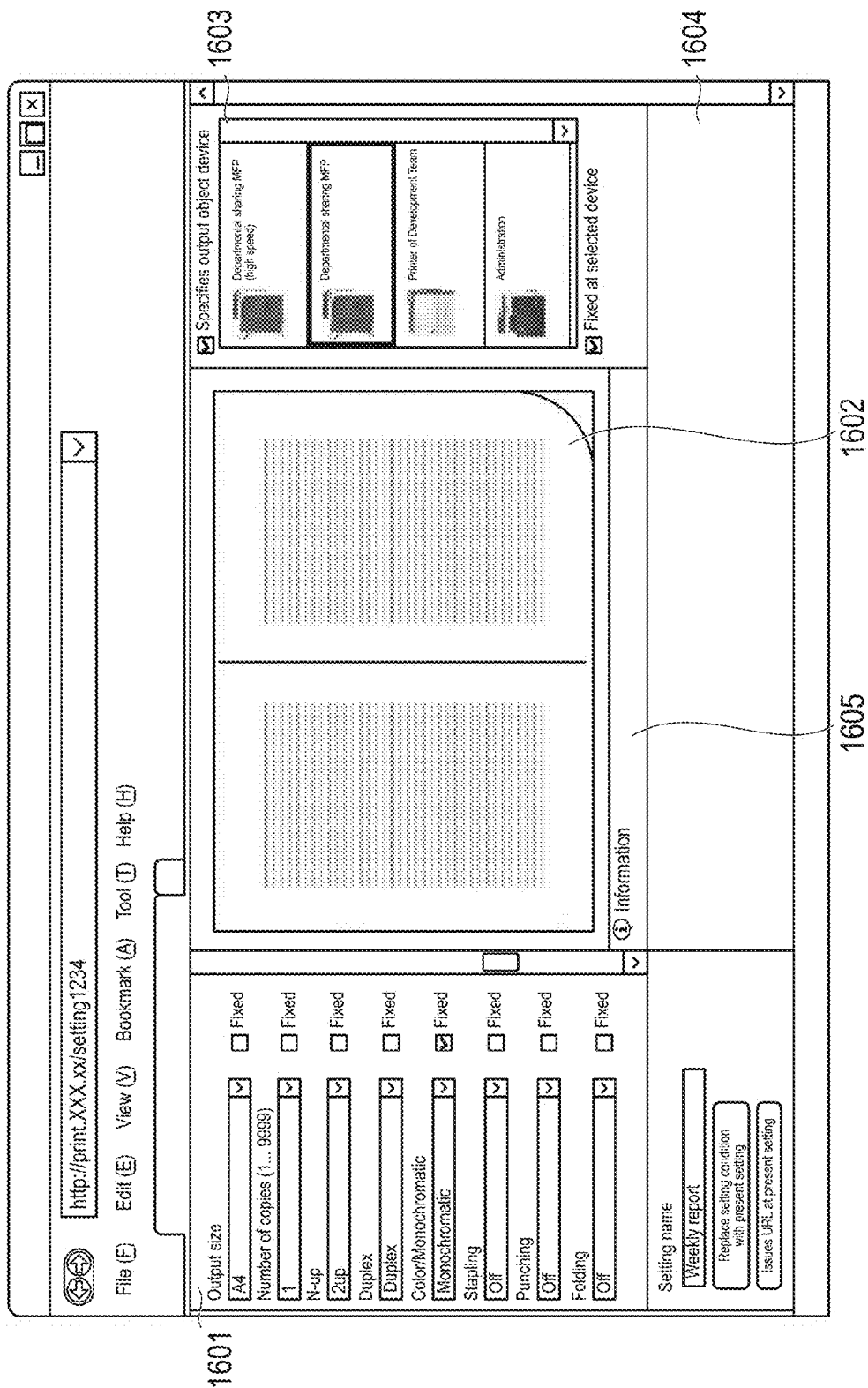
FIG. 17 is a diagram showing a screen for new registration and edition of the print setting to be displayed on the web browser of the client computer.

FIG. 17 is a diagram showing a screen used for the new registration and editing of the print setting to be displayed on the web browser of the client computer.

As shown in FIG. 17, the screen for new registration and edition of print setting comprises a print setting input part 1601, a print preview part 1602, an output device selection part 1603, a setting executing instruction part 1604, and an information part 1605.

The screen for new registration and edition of the print setting is displayed by pressing either "Edit" or "New" selection button is pressed on the list display screen of print setting data shown in FIG. 16. The print setting input part 1601 displays the contents of the present print setting data corresponding to the name of the selected print setting, while the print preview part 1602 displays the preview screen which is the image of the printed material on which the contents of the present print setting data are reflected.

The user can modify the print setting by means of modifying each parameter of the print setting displayed on the print setting input part 1601.

Incidentally, the printing apparatus to be used for outputting the printed material can be changed at the output device selection part 1603. The number of the printing apparatuses to be used for printing is not limited.

The user can obtain various kinds of information from the information part 1605.

Figure 18:
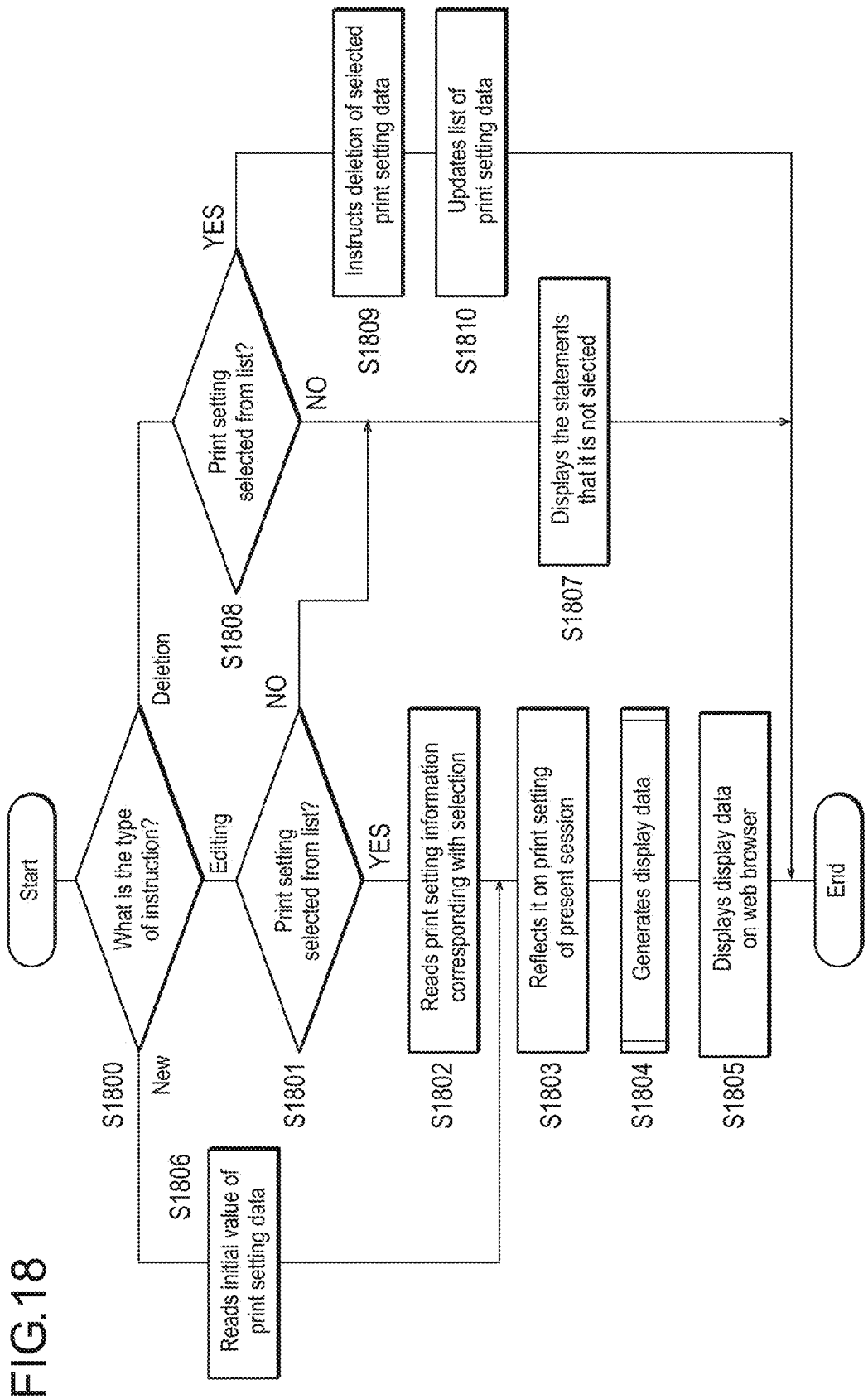
FIG. 18 is a diagram showing a flowchart for new registration, edition and deletion of the print setting.

FIG. 18 is a diagram showing a flowchart in case of newly registering, editing and deleting of the print setting.

In the web server 10, a judgment is made on the type of an instruction transmitted by the user from the client computer 20 or 21 (S1800). New registration, edition and deletion of the print setting is executed based on an instruction from the web browser 23 of the client computer 20 or 21 by the user.

The user can executed new registration, edition or deletion of the print setting by selecting one of those processes on the list display screen for the print setting data (FIG. 16). The instruction for new registration, edition or deletion of the print setting is transmitted from the client computer 20 or 21 to the web server 10.

The user can execute new registration and edition on the screen for new registration and edition of the print setting (refer to FIG. 17).

The print setting input part 1601 which is the screen for new registration and edition of the print setting displays the contents of the present print setting data that associated with the selected URL (or the name of the print setting). The print preview part 1602 displays a preview screen which is the image of the printed material on which the contents of the present print setting data are reflected.

After modifying the contents of the print setting data, the user can execute the edition of the print setting by pressing the "Replace setting condition with present setting" button at the setup executing instruction part 1604. The print setting data after the modification is transmitted to the web server 10.

On the other hand, the user can execute new registration of the print setting by modifying the name of the print setting at the setting executing instruction part 1604 in addition to the modification of the print setting data, and pressing the "Issues the URL with the present setting" button. The print setting data to be newly registered is transmitted to the web server 10.

The job control unit 12 makes a judgment as to whether or not the print setting intended to be edited on the list display screen of the print setting data is selected, if the type of the user's instruction is "Edit" (S1801).

If the print setting to be edited is not selected (S1801: No), the job control unit 12 transmits the display data that is to display a statement of that effect on the web browser 23 of the client computers 20 and 21, and the client computers 20 and 21 display on the web browser 23 a statement that the print setting is not made (S1807).

If the print setting to be edited is selected (S1801: Yes), the job control unit 12 reads the selected print setting data from the print setup control unit 13 (S1802). Then, the display data based on the selected print setting data is displayed on the web browser 23 of the client computers 20 and 21.

The user can modify the print setting displayed on the web browser 23.

The job control unit 12 causes the modified print setting data to be reflected on the print setting of the present session (S1803).

The job control unit 12 causes the display data generation unit 15 to generate the display data for displaying the print setting after the modification and the print data on which the modified print setting is reflected, on the web browser 23 of the client computers 20 and 21 (S1804), and transmits the generated display data to the client computers 20 and 21 to cause it to be displayed on the web browser (S1805).

The editing process is completed as the modified print setting is registered at the print setting control unit 13.

On the other hand, if the type of the user's instruction at Step S1800 is "New," the job control unit 12 reads the initial value of the print setting data from the print setting control unit 13 (S1806). At this time, the display data based on the initial value of the print setting data is displayed on the web browser 23 of the client computers 20 and 21.

The job control unit 12 can acquire the print setting data setup by either the printing apparatus 30, 31 of 32 when either the printing apparatus 30, 31, or 32 read the contents of the document by the reading unit 308 as the initial value.

The user can modify the initial value of the print setting displayed on the web browser 23. The user can also modify the name of the print setting to be newly registered.

The job control unit 12 causes the modified print setting data to be reflected on the print setting of the present session (S1803).

The job control unit 12 causes the display data generation unit 15 to generate the display data for displaying the print setting after the modification and the print data on which the modified print setting is reflected, on the web browser 23 of the client computers 20 and 21 (S1804), and transmits the generated display data to the client computers 20 and 21 to cause it to be displayed on the web browser (S1805).

The new registration is completed as the print setting after the modification is registered together with the new URL associated with it at the print setting control unit 13.

If the type of the user's instruction is "Delete" at Step S1800, the job control unit 12 makes a judgment as to whether or not the print setting intended to be edited on the list display screen of the print setting data is selected (S1808).

If the print setting to be edited is not selected (S1808: No), the job control unit 12 transmits to the client computers 20 and 21 the display data that is to display a statement of that effect on the web browser 23 of the client computers 20 and 21, and the client computers 20 and 21 display on the web browser 23 a statement that the print setting is not made (S1807).

If the print setting to be edited is selected (S1803: Yes), the job control unit 12 issues an instruction for deletion of the selected print setting data to the print setup control unit 13 (S1809).

The print setting control unit 13 deletes the selected print setting data from the print setting data storage unit 16, and updates the list of print setting data by deleting the selected print setting data from the list of print setting data (S1810).

Figure 19:
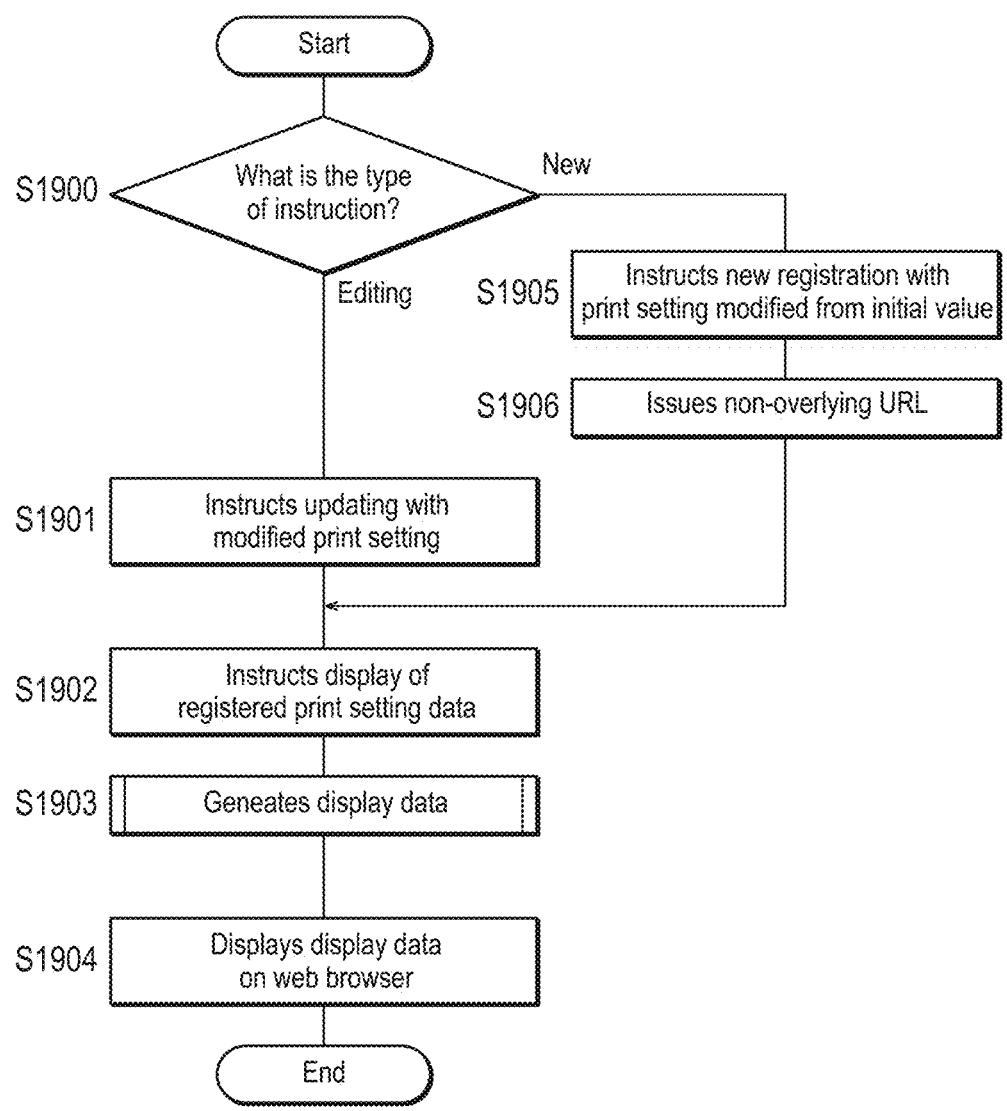
FIG. 19 is a diagram showing a flowchart for issuing of a new URL associated with the print setting and editing the print setting.

FIG. 19 is a diagram showing a flowchart for issuing of a new URL associated with the print setting and editing the print setting.

At the web server 10, a judgment is made on the type of an instruction made by the user from the client computer 20 or 21 (S1900). The new registration and the edition of the print setting are executed based on the instruction entered by the user to the web browser 23 of the client computers 20 and 21.

If the type of the user's instruction is "Edit," the job control unit 12 issues to the print setting control unit 13 an instruction for updating the print setting according to the print setting modified at the client computer 20 or 21 (S1901). The print setting control unit 13 edits the print setting data by way of updating the print setting data by replacing the original print setting data with the modified print setting data, and stores the edited print setting data in the storage unit 16 to have it registered.

The job control unit 12 issues an instruction to generate the display data concerning the edited print setting data that is registered at the display data generating unit 15 (S1902). The display data generation unit 15 generates the display data concerning the edited print setting data that is registered (S1903). The generated display data is transmitted to the client computers 20 and 21, and displayed on the web browser 23 of the client computers 20 and 21 (S1904).

On the other hand, the user can issue the new URL and register the print setting that associated with the new URL at the list display screen of the print setting data (refer to FIG. 15) by selecting the new registration of the print setting. Additionally, the user can execute the new registration on the screen for new registration and edition of the print setting (refer to FIG. 16). The user can issue the URL that associates with the print setting data concerning the modified print setting by pressing the "Issue URL at present setting" button in the setting executing instruction part 1604 of the screen for the new registration and edition of the print setting. At that time, a message notifying that there is an instruction for issuing the URL and the print setting data concerning the modified print setting are transmitted to the web server 10.

In Step S1900, if the type of the user's instruction is "New," the job control unit 12 issues to the print setting control unit 13 an instruction for newly registering the print setting according to the print setting modified from the initial value of the print setting at the client computer 20 or 21 (S1905). The print setting control unit 13 causes the modified print setting data to be stored into the storage unit 16 to be newly registered, and issues a new URL that associated with the modified print setting data and does not overlap with other URLs (S1906).

The job control unit 12 issues an instruction to the display data generating unit 15 generating the display data concerning the newly registered print setting data to the display data generating unit 15 (S1902). The display data generating unit 15 generates the display data concerning the newly registered print setting data (S1903). The generated display data is transmitted to the client computers 20 and 21, and displayed as the new URL issuing notification screen on the web browser 23 of the client computers 20 and 21 (S1904).

Figure 20:
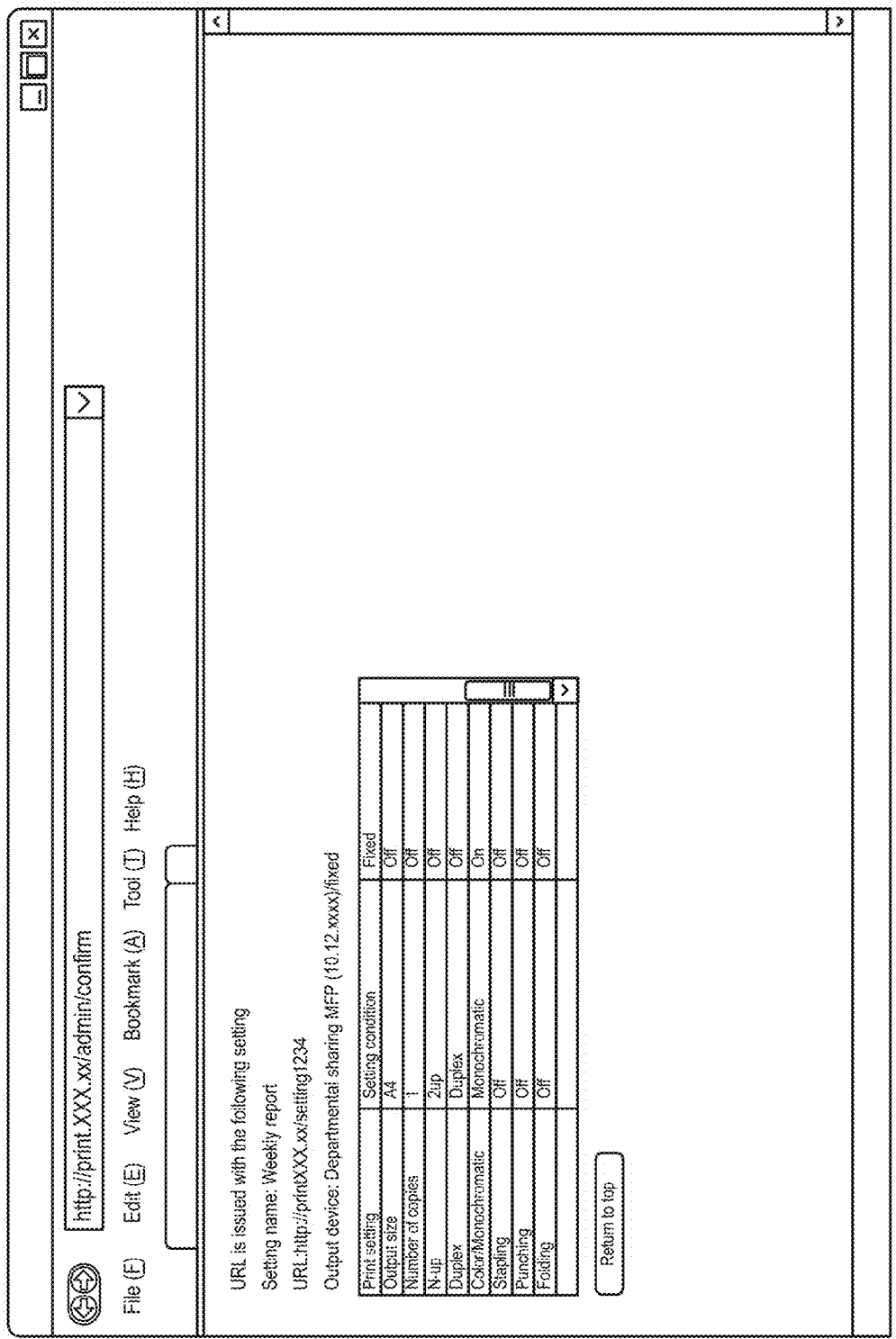
FIG. 20 is a diagram showing a new URL issuing notification screen to be displayed on the web browser when print setting data is newly registered.

FIG. 20 is a diagram showing a new URL issuing notification screen to be displayed on the web browser when print setting data is newly registered.

As shown in FIG. 20, the new URL issuing notification screen displays the name of the print setting associated with the new URL, the URL, the printing apparatus to which the output is assigned, and other print setting as well, along with the notice that a new URL is issued but also displays.

While such is the description of the web server, the printing apparatus, and the program for web server of the present embodiment, the present embodiment provides the following advantageous effect.

In direct printing via the web browser, the URL and the print setting information associated with it are stored in the web server in advance, and the print setting information associated with the URL entered into the web browser by the user is reflected upon the print setting of the print data. This makes it possible to reflect the print setting on the print data more easily and quickly, and to implement a flexible print setting such as designating the print setting to another user or using with a partial modification of the print setting more easily.

For example, by including the string of texts hyper-linked to the URL associated with the print setting in the email description, it is possible to use a common print setting without forcing extra works for the user who received the email.

Moreover, by displaying the contents of the print setting associated with the URL and the preview screen of the printed material that reflects the print setting by means of entering the URL, it is possible to shorten the user's work steps and make it easier for the user to check the appearance of the printed material.

Also, it is possible to use the existing print setting more easily by storing and reusing the URL that was used once for the print setting by means of the favorite functions or the bookmark function of the web browser.

Moreover, it is made unnecessary to install the printer driver into the client computer by direct printing using the web browser.

The web browser, printing apparatus, printing system and the program for web server in accordance with the present invention are not limited to the present embodiment mentioned above.

For example, the system can be configured in such a manner that the printing apparatus of the printing destination setup in the print setting data is a tablet computer and the print setting data is the data for setting up the image to be displayed at the tablet computer.

What is claimed is:

1. A printing apparatus for conducting printing from a client computer via a web browser comprising:
    a memory; and
    a processor,
    wherein said memory stores a print setting and a URL that is associated with said print setting,
    wherein said processor generates a web page for displaying said print setting that is associated with said URL, in reaction to the URL being entered by a user into said web browser,
    wherein said processor causes said client computer to display said generated web page on said web browser, wherein said processor receives a selection of a file to be printed by the user after said generated web page is displayed on said web browser, and wherein said processor reflects said print setting that is associated with said entered URL as a print setting of the file which is selected by the user.

2. The printing apparatus as claimed in claim 1, wherein said print setting includes at least either a setting of a printing function of a printing apparatus or a setting of said printing apparatus by which the user intends to print.

3. The printing apparatus as claimed in claim 1, wherein:
said screen displayed on said web browser is capable of receiving a modification of said print setting that is associated with said URL, and
said processor reflects the modified print setting as the print setting of said selected file when the modification of said print setting is received in said screen.

4. The printing apparatus as claimed in claim 1 further comprising:
a registration unit for issuing said URL associated with said print setting and registering said URL issued and said print setting that associated with said URL.

5. The printing apparatus as claimed in claim 1, wherein at least one of the setting among the setting included in said print setting that is stored along with being associated with the URL is the setting that is managed by an administrator and cannot be modified by any user.

6. The printing apparatus as claimed in claim 1, wherein said printing apparatus is connected to other printing apparatuses, and said print setting that is stored along with being associated with the URL includes the print setting for other printing apparatuses.

7. The printing apparatus as claimed in claim 1 wherein said processor issues said URL that is associated with said print setting and registers said URL issued and said print setting to associate with each other.

8. The printing apparatus as claimed in claim 2, wherein said setting of printing function includes at least one of setting of stapling, setting of punching, setting of duplex print, and setting of color or monochromatic.

9. The printing apparatus as claimed in claim 3, wherein said printing apparatus comprises a scanning unit for scanning an image of a document; and
said processor adopts said print setting that is set when said scanning unit scanned as an initial value and modifies all or a portion of said initial value in order to modify said print setting.

10. The printing apparatus as claimed in claim 1, wherein said processor displays a preview image based on said print setting that is associated with said entered URL and said selected file on said screen displayed on said web browser.

11. A non-transitory computer readable storage medium stored with a program to cause a web server to execute printing from a client computer via a web browser, said program causing said web server to execute a process comprising:
a step (a) for storing a print setting and a URL that is associated with said print setting information;
a step (b) for generating a web page for displaying said print setting that is associated with said URL, in reaction to the URL being entered by a user into the web browser;
wherein said generated web page is displayed on said web browser, and
a step (c) for receiving a selection of a file to be printed by the user after said generated web page is displayed on the web browser;

wherein said print setting that is associated with said entered URL is reflected as a print setting of the file which is selected by the user.

12. The non-transitory computer readable storage medium as claimed in claim 11 comprising:
said print setting includes at least either a setting of a printing function of a printing apparatus or a setting of said printing apparatus by which the user intends to print.

13. The non-transitory computer readable storage medium claimed in claim 11, wherein:
said web page displayed on said web browser is capable of receiving a modification of said print setting that is associated with said URL, and
said processor reflects the modified print setting as the print setting of said selected file when the modification of said print setting is received in said web page.

14. The non-transitory computer readable storage medium claimed in claim 11, said program further causes said web server to execute:
a step for issuing said URL that associated with said print setting and registering said URL issued and said print setting that associated with said URL.

15. The non-transitory computer readable storage medium claimed in claim 11, said program further causes said web server to execute:
a step for issuing said URL that is associated with said print setting and registering said URL issued and said print setting to associate with each other.

16. The non-transitory computer readable storage medium claimed in claim 11, wherein
said processor displays a preview image based on said print setting that is associated with said entered URL and said selected file on said web page displayed on said web browser.

17. A web server for conducting printing via a web browser comprising:
a memory; and
a processor,
wherein said memory stores a print setting and a URL that is associated with said print setting,
wherein said processor generates a web page for displaying said print setting that is associated with said URL, in reaction to the URL being entered by a user into said web browser,
wherein said processor displays said generated web page on said web browser,
wherein said processor receives a selection of a file to be printed by the user after said generated web page is displayed on said web browser, and
wherein said processor reflects said print setting that is associated with said entered URL as a print setting of the file which is selected by the user.

18. A printing system for conducting direct printing via a web browser comprising:
one of more client computers to which a user enters at said web browser a URL that associated with print setting of print data;
a memory; and
a processor,
wherein said memory stores a print setting and a URL that is associated with said print setting,
wherein said processor generates a web page for displaying said print setting that is associated with said URL, in reaction to the URL being entered by a user into said web browser, at said client computer, wherein said processor displays said generated web page on said web browser, wherein said processor receives a selection of a file to be printed by the user after said generated web page is displayed on said web browser, and wherein said processor reflects said print setting that is associated with said entered URL as a print setting of the file which is selected by the user.

19. The printing apparatus as claimed in claim 1, wherein said selection of said file to be printed is conducted via said generated web page on said web browser after said generated web page is displayed on said web browser.

20. The non-transitory computer readable storage medium as claimed in claim 11, wherein said selection of said file to be printed is conducted via said generated web page on said web browser after said generated web page is displayed on said web browser.

21. The printing system as claimed in claim 11, wherein said selection of said file to be printed is conducted via said generated web page on said web browser after said generated web page is displayed on said web browser.

* * * * *